United States Patent
Liu et al.

(10) Patent No.: US 12,468,027 B2
(45) Date of Patent: Nov. 11, 2025

(54) GROUND PENETRATING RADAR AND DEEP LEARNING-BASED UNDERGROUND PIPELINE DETECTION METHOD AND SYSTEM

(71) Applicant: Guangzhou University, Guangdong (CN)

(72) Inventors: Hai Liu, Guangdong (CN); Xu Meng, Guangdong (CN); Chao Liu, Guangdong (CN); Jie Cui, Guangdong (CN)

(73) Assignee: Guangzhou University, Guangzhou (CN)

( * ) Notice: Subject to any disclaimer, the term of this patent is extended or adjusted under 35 U.S.C. 154(b) by 370 days.

(21) Appl. No.: 18/063,718

(22) Filed: Dec. 9, 2022

(65) Prior Publication Data

US 2023/0108634 A1   Apr. 6, 2023

Related U.S. Application Data

(63) Continuation-in-part of application No. PCT/CN2021/113749, filed on Aug. 20, 2021.

(30) Foreign Application Priority Data

Sep. 11, 2020 (CN) .......................... 202010951509.X

(51) Int. Cl.
*G01S 13/88* (2006.01)
*G01S 7/41* (2006.01)

(52) U.S. Cl.
CPC ............ *G01S 13/885* (2013.01); *G01S 7/417* (2013.01)

(58) Field of Classification Search
CPC .............................. G01S 13/885; G01S 7/417
See application file for complete search history.

(56) References Cited

U.S. PATENT DOCUMENTS

2012/0006116 A1   1/2012  Hwang et al.
2023/0100615 A1*  3/2023  Yuan ..................... G06T 3/4053
                                                         348/43

FOREIGN PATENT DOCUMENTS

CN   107817509 A   3/2018
CN   109685011 A   4/2019
(Continued)

OTHER PUBLICATIONS

Zong, Zeliang, et al. "A deep learning approach for urban underground objects detection from vehicle-borne ground penetrating radar data in real-time." The International Archives of the Photogrammetry, Remote Sensing and Spatial Information Sciences 42 (2019): 293-299. (Year: 2019).*

(Continued)

*Primary Examiner* — Vladimir Magloire
*Assistant Examiner* — Nazra Nur Waheed

(57) ABSTRACT

A ground penetrating radar and deep learning-based underground pipeline detection method and system. Said method comprises: acquiring sample data of known underground pipelines by means of a ground penetrating radar, and establishing an GPR B-scan dataset according to the sample data; performing training according to the GPR B-scan dataset to obtain a YOLOv3 model, the YOLOv3 model being used for identifying hyperbolic data of the underground pipelines; detecting underground pipeline targets in a real radar image by means of the YOLOv3 model; and precisely locating the positions of pipelines by means of an RTK measurement instrument. Said method is based on a ground penetrating radar and a YOLOv3 model, and can accurately identify hyperbolic targets of pipelines in ground penetrating radar images, thereby improving the detection efficiency and reducing time costs. The present invention (Continued)

can be widely applied to the field of engineering nondestructive testing.

6 Claims, 6 Drawing Sheets

(56) References Cited

FOREIGN PATENT DOCUMENTS

| CN | 109829386 A | 5/2019 |
|---|---|---|
| CN | 110308444 A | 10/2019 |
| CN | 110866545 A | 3/2020 |
| FR | 2802303 A1 | 6/2001 |
| JP | 2007085965 A | 4/2007 |

OTHER PUBLICATIONS

Marble, Jay A., and Andrew E. Yagle. "Measuring landmine size and burial depth with ground-penetrating radar." Detection and Remediation Technologies for Mines and Minelike Targets IX. Vol. 5415. SPIE, 2004. (Year: 2004).*

Bisheng Yang et al., Real time approach for underground objects detection from vehicle-borne ground penetrating radar, Acta Geodaetica et Cartographica Sinica, Jul. 2020, pp. 874-882, vol. 49, No. 7.

Deshan Feng et al., Automatic recognition of ground penetrating radar image of tunnel lining structure based on deep learning, Progress in Geophysics, 2020, pp. 1552-1556, vol. 35, No. 4.

Haobang Hu et al., Intelligent Recognition of Pipeline Target Based on Faster R-CNN Algorithm for Ground Penetrating Radar, Urban Geotechnical Investigation & Surveying, Jun. 2020, pp. 203-208, Issue 3.

Di Zhao et al., Ground penetrating radar anomaly detection based on convolution Grad-CAM, Electronic Measurement Technology, May 2020, pp. 113-118, vol. 43, Issue 10.

Yijun Wang et al., Research on Insulator Self Explosion Detection Method Based on Deep Learning, Journal of Northeast Electric Power University, Jun. 2020, pp. 33-40, vol. 40, No. 3.

International Search Report of PCT Patent Application No. PCT/CN2021/113749 issued on Nov. 17, 2021.

\* cited by examiner

GROUND PENETRATING RADAR AND DEEP LEARNING-BASED UNDERGROUND PIPELINE DETECTION METHOD AND SYSTEM

CROSS REFERENCE TO RELATED APPLICATIONS

The present application is a Continuation-In-Part Application of PCT Application No. PCT/CN2021/113749 filed on Aug. 20, 2021, which claims the benefit of Chinese Patent Application No. 202010951509.X filed on Sep. 11, 2020. All the above are hereby incorporated by reference in their entirety.

FIELD OF THE INVENTION

The present disclosure relates to the field of engineering non-destructive testing, and more particularly to a ground penetrating radar (GPR), deep learning-based underground pipeline detection method and system and a Localization method by using migration, binarization and Apex localization and combining a real-time kinematic (RTK) device and the GPR.

BACKGROUND OF THE INVENTION

An underground pipe network is an indispensable and important part in the operation and development of modern cities. As an important infrastructure, the underground pipe network not only provides important living materials for residents in a city, but also undertakes the responsibility of providing basic resources and energy for the production and development of the city. In the process of city construction, due to the lack of accurate layout of underground pipelines in a construction area and the lack of rapid and accurate pipeline detection means, accurate underground pipeline distribution may not be obtained, so that the pipelines cannot be effectively avoided and thus damaged in the construction process, thereby affecting the normal life of city residents and the healthy operation of the city, and even causing a series of safety accidents.

The GPR is a non-destructive detection method to detect the internal structure and distribution rule of a medium by transmitting and receiving ultra-wideband high-frequency pulsed electromagnetic waves, which has the advantages of high detection efficiency, easy operation and high detection accuracy, is widely used in engineering field, and gradually becomes the main means of underground pipeline detection. However, in the underground pipeline detection process, a large amount of data will be generated in the detection process due to high-speed data collection. Interpretation of data manually is time consuming and labor intensive, and depends heavily on the level of expertise and engineering experience of practitioners. In practical detection application, an underground pipeline target is represented in the form of hyperbola in GPR data, and has obvious features and obvious discrimination with a background medium. How to recognize this imaging feature and locate the buried pipeline is a technical problem to be solved urgently by those skilled in the art.

Real-time kinematic (RTK) is a differential method for processing carrier phase observations of two measurement stations in real time, and solving coordinates by difference. A real-time kinematic (RTK) records the latitude and longitude information of the antenna. Normally, an underground pipeline can be characterized by a hyperbolic pattern in a B-scan GPR profile. Thus, the hyperbola features are used to detect buried pipelines from GPR images. To achieve the accurate localization of the rebar hyperbola in GPR image, the hyperbolic vertexes are localized through the segmented GPR images. Normally, rebars are easy to be localized because of their regular distribution and the relatively homogeneous background medium, i.e., concrete. However, the urban underground pipelines are buried in complex soil and their materials are much different, with a low signal-to-clutter ratio characterize the pipeline GPR images. These characters impose a big challenge to detect and localize underground pipelines from GPR images.

SUMMARY OF THE INVENTION

In view of this, embodiments of the present disclosure provide a GPR and deep learning-based underground pipeline detection method and system, which are high in accuracy and efficiency.

According to a first aspect of the present disclosure, a GPR and deep learning-based underground pipeline detection method is provided, including:
  acquiring training dataset of known underground pipelines by means of a GPR, and establishing an GPR B-scan dataset according to the sample data:
  performing training according to the GPR B-scan dataset to obtain a target identification model You Only Look Once version 3 (YOLOV3), the target identification model YOLOV3 being configured to identify hyperbolic data of the underground pipelines:
  detecting underground pipeline targets in a real radar image by means of the target identification model YOLOV3; and
  a localization algorithm based on migration and binarization is proposed to locate the underground pipeline position.

In some embodiments, the acquiring sample data of known underground pipelines by means of a GPR and establishing an GPR B-scan dataset according to the sample data includes:
  acquiring scanning data of the known underground pipelines by means of the GPR;
  converting the scanning data into grayscale GPR B-scan data;
  filtering target GPR B-scan data from the grayscale GPR B-scan data, the target GPR B-scan data comprising a pipeline hyperbola:
  performing data enhancement on the target GPR B-scan data;
  cropping all images obtained after the data enhancement to obtain sample data; and
  constructing an GPR B-scan dataset according to the sample data.

In some embodiments, the constructing an GPR B-scan dataset according to the sample data includes:
  labeling a hyperbolic object in the sample data by means of a rectangular real box to obtain coordinate information of the rectangular real box:
  dividing the sample data into a positive sample and a negative sample according to the coordinate information; and
  constructing an GPR B-scan dataset according to the positive sample and the negative sample.

In some embodiments, a basic network of the target identification model YOLOV3 is a Darknet53 deep learning framework:

the Darknet53 deep learning framework is composed of 53 convolutional layers; and each of the convolutional layers includes a batch normalization layer and a leaky rectified linear unit layer.

In some embodiments, the batch normalization layer is configured to accelerate network training and network convergence; and the leaky rectified linear unit layer is configured to introduce a leaky value in a negative half interval of a rectified linear unit function, so that neuron is capable of continuing to learn after the rectified linear unit function enters a negative interval.

According to a second aspect of the present disclosure, a GPR and deep learning-based underground pipeline detection system is provided, including:

a dataset establishment module, configured to acquire sample data of known underground pipelines by means of a GPR, and establish an GPR B-scan dataset according to the sample data:

an identification module, configured to perform training according to the GPR B-scan dataset to obtain a target identification model YOLOV3, the target identification model YOLOV3 being configured to identify hyperbolic data of the underground pipelines:

a detection module, configured to detect underground pipeline targets in a real radar image by means of the target identification model YOLOV3; and a localization module, configured to locate the positions of the underground pipelines by combining an RTK device and the GPR.

In the embodiments of the present disclosure, sample data of known underground pipelines is acquired by means of a GPR, and an GPR B-scan dataset is established according to the sample data. Training is performed according to the GPR B-scan dataset to obtain a target identification model YOLOV3. The target identification model YOLOV3 is configured to identify hyperbolic data of the underground pipelines. Underground pipeline targets in a real radar image are detected by means of the target identification model YOLOV3. The present disclosure, based on a GPR and a target identification model YOLOV3, can precisely identify hyperbolic targets of pipelines in GPR images, thereby improving the detection efficiency and reducing the time cost. Meanwhile, accurate geographic position coordinate points of underground pipelines are obtained by combining an RTK device and the GPR.

A GPR data processing flow is proposed for automatic localization of an underground pipeline. The target identification model YOLOV3 is used to identify the target bounding box of an underground pipeline, and the hyperbolic reflection signal of the underground pipeline is reconstructed by migration into a circular response. Then, the image binarization using an iterative thresholding method distinguishes the target response from the background, and its vertex is used to determine the position of the buried pipeline. The ground coordinates of the pipeline are determined according to the GPS coordinates recorded in the radar head-file. Finally, the buried depth of the pipeline is calculated from the corresponding two-way travel time of the target vertex and the EM velocity of the background medium, determined during the migration process.

BRIEF DESCRIPTION OF THE DRAWINGS

In order to more clearly illustrate the technical solutions of the embodiments of this application, the drawings required to describe the embodiments will be briefly introduced below. It is apparent that the drawings described below are merely some embodiments of this application and those ordinarily skilled in the art may obtain other drawings according to these drawings without paying creative work.

DETAILED DESCRIPTION OF THE EMBODIMENTS

The present disclosure will be further explained and described below with reference to the accompanying drawings and specific embodiments. The step numbers in the embodiments of the present disclosure are provided only for the convenience of explanation, and the steps in the embodiments will be performed in an unlimited order which may be adaptively adjusted according to the understanding of those skilled in the art.

Figure 1:
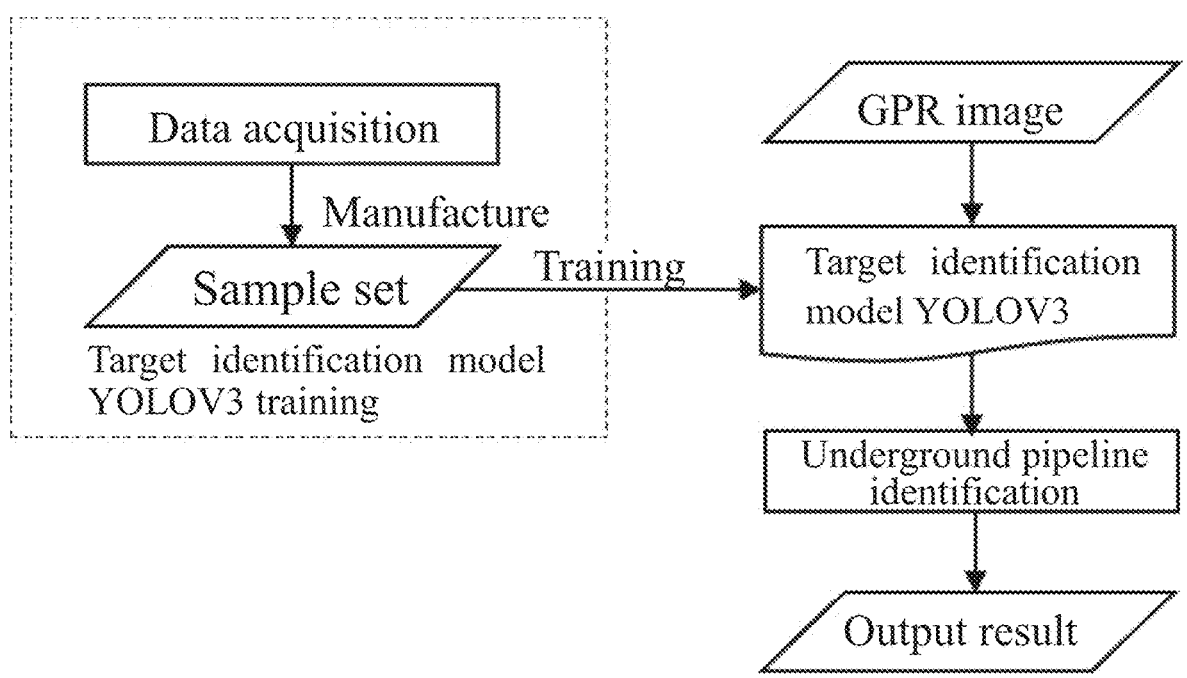
FIG. 1 is a flowchart of GPR image labelling and recognition.

In view of the problems existing in the related art, embodiments of the present disclosure provide a GPR and deep learning-based underground pipeline detection method. As shown in FIG. 1, the method includes the following steps:

At S1, sample data of known underground pipelines is acquired by means of a GPR, and an GPR B-scan dataset is established according to the sample data.

Specifically, in the embodiments of the present disclosure, a GPR is used for detecting known underground pipelines and collect data to create a sample set, mark a pipeline hyperbola in each sample image with a real box, and establish an GPR B-scan dataset.

At S2, training is performed according to the GPR B-scan dataset to obtain a target identification model YOLOV3. The target identification model YOLOV3 is configured to identify hyperbolic data of the underground pipelines.

Figure 2:
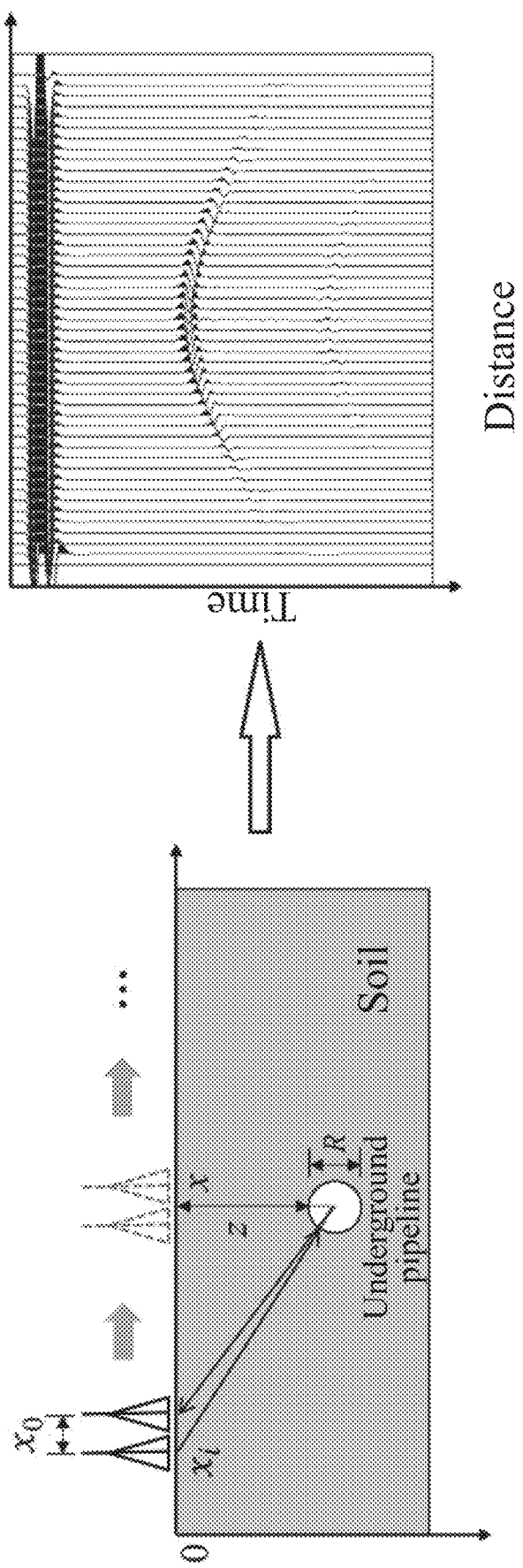
FIG. 2 is a schematic diagram of a GPR detecting an underground pipeline and a corresponding hyperbola of the pipeline in a GPR image according to an embodiment of the present disclosure.

As shown in FIG. 2, xo is a distance between a transmitting antenna and a receiving antenna, xi is coordinate x of the antenna at position i, R is a diameter of an underground pipeline, and z is a buried depth of the underground pipeline. This figure illustrates the imaging principle of a GPR image and the imaging features of an underground pipeline in the GPR image.

Specifically, in the embodiments of the present disclosure, a target identification model YOLOV3 is trained with samples to obtain a target identification model YOLOV3 capable of identifying a pipeline hyperbola.

At S3, underground pipeline targets in a real radar image are detected by means of the target identification model YOLOV3.

Specifically, in the embodiments of the present disclosure, GPR profile images of newly collected underground pipelines are intelligently identified by means of the target identification model YOLOV3.

At S4, the positions of the underground pipelines are located by using the method of migration, binarization and Apex localization and combining an RTK device and the GPR.

Figure 5:
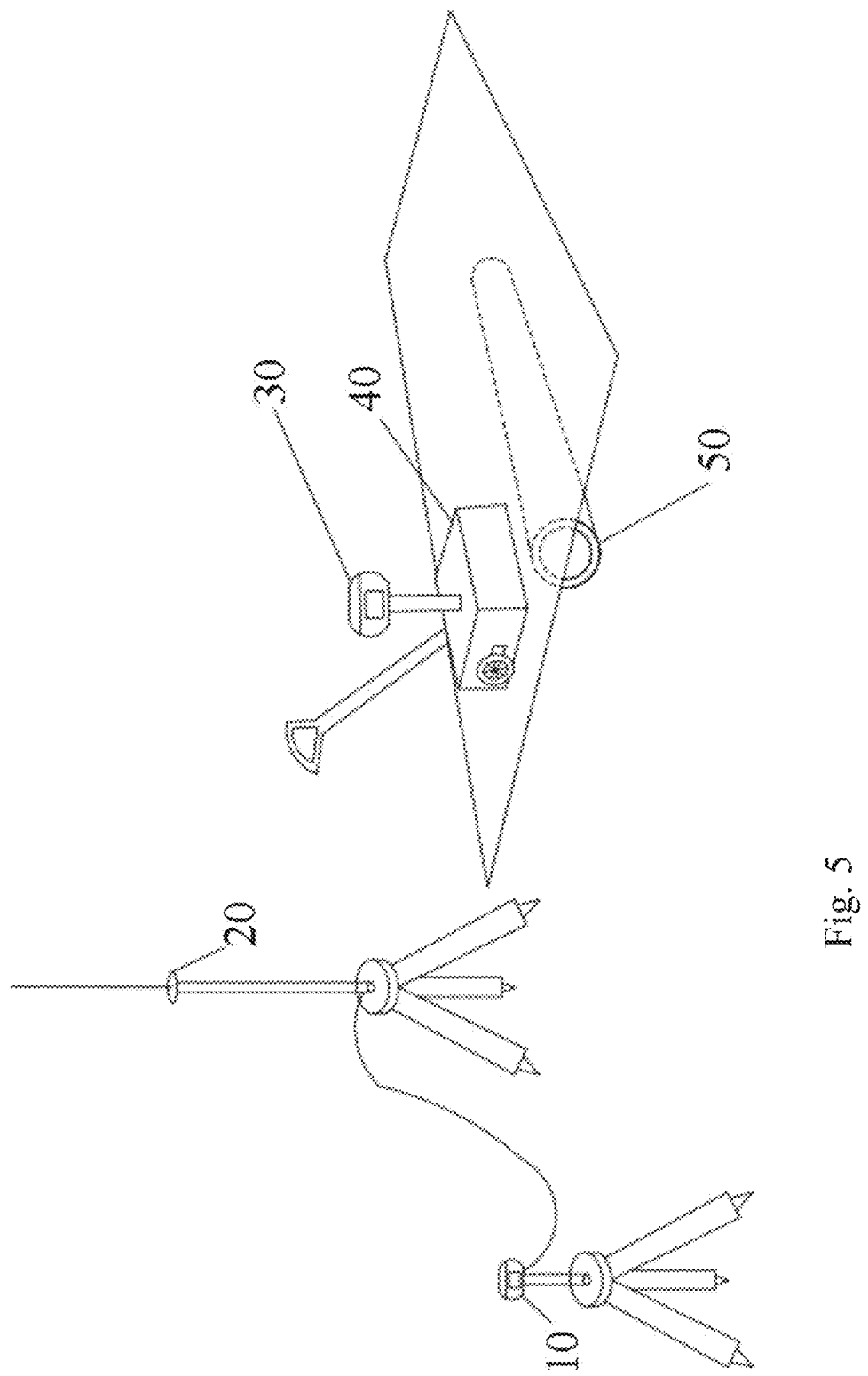
FIG. 5 is a schematic diagram of using an RTK measurement instrument according to an embodiment of the present disclosure.
Figure 6:
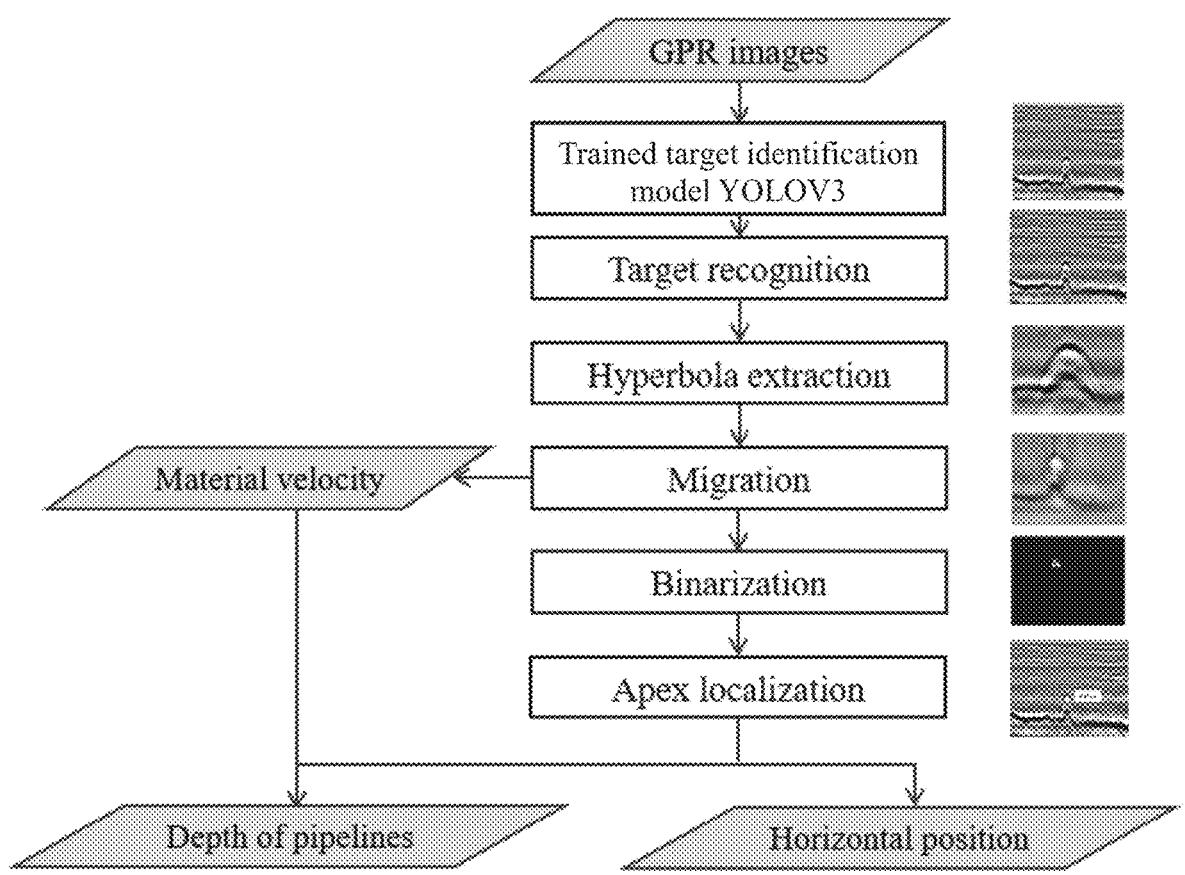
FIG. 6 is a flowchart of the proposed algorithm for automatic pipeline localization.

Specifically, FIG. 5 is a schematic diagram of using an RTK measurement instrument for precisely locating the positions of the underground pipelines 50. In the examples of the present disclosure, an RTK measurement instrument and a GPR 40 are combined. Firstly, a reference station antenna 20 and a reference station receiver 10 are built, and a mobile station receiver 30 is built above the GPR 40, and is connected to a GPR collection device by means of a data line, so that when the GPR 40 collects electromagnetic wave data, the receiver 30 records longitude, latitude and elevation information of a position through which the GPR 40 passes, and the information corresponds to each GPR data. Thus, the position through which the GPR 40 passes can be determined, and the locating accuracy is in the centimeter level. FIG. 6 is a schematic diagram of using the method of diffraction stack migration, binarization and apex localization to determine the position of the buried pipeline. In the examples of the present disclosure. Firstly, the hyperbolic reflection signal of the underground pipeline is reconstructed by migration into a circular response. Then, the image binarization using an iterative thresholding method distinguishes the target response from the background, and its vertex is used to determine the position of the buried pipeline. The ground coordinates of the pipeline are determined according to the GPS coordinates recorded in the radar headfile.

In some embodiments, step S1 includes S11-S16:

At S11, scanning data of the known underground pipelines is acquired by means of the GPR.

Data for manufacturing a sample set is real data collected in the field, has a high application value, and can more realistically reflect the influence of external factors in the data collection process, such as noise interference, noisy background caused by soil non-uniformity and the influence of human operation on the data. These interference influences will be realistically reflected in samples, so that the trained target identification model YOLOV3 is more robust and more suitable for practical engineering applications.

At S12, the scanning data is converted into grayscale GPR B-scan data.

At S13, target GPR B-scan data is filtered from the grayscale GPR B-scan data. The target GPR B-scan data includes a pipeline hyperbola.

At S14, data enhancement is performed on the target GPR B-scan data.

At S15, all images obtained after the data enhancement are cropped to obtain sample data.

At S16, an GPR B-scan dataset is constructed according to the sample data.

Specifically, the sample set manufacturing method for training a model according to the embodiments of the present disclosure includes: converting scanning data of an underground pipeline B collected by the GPR into a grayscale image in a JPG format, retaining GPR B-scan data containing pipeline hyperbolas by data filtration, amplifying the data amount by a data enhancement strategy such as scaling by 0.8 times, 1.5 times and 2 times and horizontal flip, and cropping all the images into 416×416 pixels to obtain a sample set with a sample size of 416×416.

Since the collected data is not in the JPG format, the data cannot be used for training the target identification model YOLOV3 in the form of pictures. The data is converted to the grayscale image in the JPG format by software (e.g. MATLAB), and the data containing the pipeline hyperbolas is retained by data filtration. The data amount is amplified by a data enhancement strategy such as scaling by 0.8 times, 1.5 times and 2 times and horizontal flip, and all the images are cropped into 416×416 pixels to obtain a sample set with a sample size of 416×416. The augmented strategy is conducive to quickly obtaining a large number of actually collected data, thus greatly saving human and material resources.

In some embodiments, the sample set includes a positive sample and a negative sample, and hyperbolic targets in the samples are manually labeled. That is, each hyperbolic target is completely framed by means of a rectangular real box, and coordinate information of the real box is recorded. The sample set is divided into a training set and a test set. The sample number ratio of the training set to the test set is 3:1.

The manner of learning target features by the target identification model YOLOV3 is supervised learning. Therefore, a target in each sample needs to be marked by manual labeling. The marking content is to mark the target with a rectangular real box, acquire coordinate information of an upper left corner ($x_{min}$, $y_{min}$) and a lower right corner ($x_{max}$, $y_{max}$) of the target rectangular box, and labeling the target with class.

Figure 3:
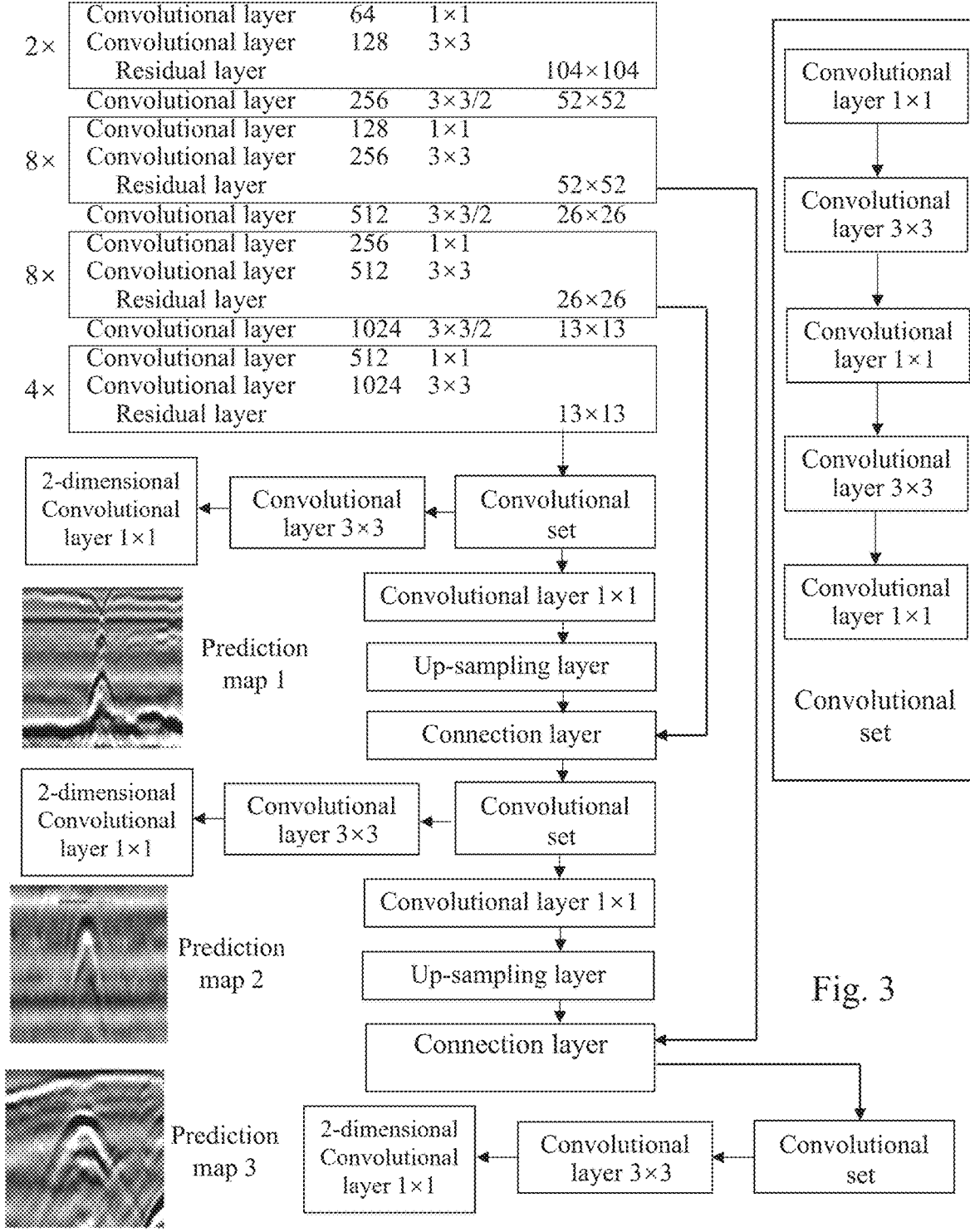
FIG. 3 is a structure of the target identification model YOLOV3 for detection GPR pipeline images.

In some embodiments, a basic network of the target identification model YOLOV3 is a real-time object detection method using R-CNN. Usually, the training of CNN model is completed by region proposal, image feature extraction, classification and recognition. Instead, YOLO uses a neural network throughout the framework, divides the image into interest regions, and then selects a bounding box on the predicted region to detect objects. The target identification model YOLOV3 is composed of three parts: a backbone for feature extraction, a neck for collecting feature maps at different stages, and a head for predicting categories and bounding boxes of targets. The structure of the target identification model YOLOV3 is shown in FIG. 3. The backbone of target identification model YOLOV3 uses the convolutional layers and a leaky rectified liner unit (LeakyReLU) activation function to enhance the learning capacity. The neck of target identification model YOLOV3 is employed with a feature pyramid network using the up-sampling method, which can improve multiscale detection capacity in the feature extraction process. The head of target identification model YOLOV3 is the prediction part of the model, which outputs the detection results at three different scales.

Specifically, the model of the embodiments of the present disclosure constantly learns the features of pipeline hyperbolas during training and calculates a loss value of a loss function to reversely adjust weight parameters of a convolutional kernel and a pooling kernel in the basic network. In the detection process, a target hyperbola is identified by generating a prediction box on a newly collected GPR image, the position of the hyperbola is predicted, and target confidence is predicted by logistic regression. The loss function of the target identification model YOLOV3 is composed of three parts: a target localization loss, a target confidence loss and a target class loss. The target localization loss and the target confidence loss adopt binary cross entropy losses, which can cope with more complex classification scenarios.

Specifically, the model of the embodiments of the present disclosure constantly is used to identify the target bounding box of an underground pipeline, and the hyperbolic reflection signal of the underground pipeline is reconstructed by migration into a circular response. Then, the image binarization using an iterative thresholding method distinguishes the target response from the background, and its vertex is used to determine the position of the buried pipeline. Finally, the buried depth of the pipeline is calculated from the corresponding two-way travel time of the target vertex and the EM velocity of the background medium, determined during the migration process.

FIG. 3 is a schematic diagram of a detection process of a target identification model YOLOV3 according to an embodiment of the present disclosure. This figure describes an algorithm structure when target identification model YOLOV3 extracts, learns, identifies, and predicts picture features. During training, the model performs intersection-over-union matching on a real box labeled by a sample and a default box, a feature content of the default box with a matching value greater than 0.5 is considered as a positive example (i.e. containing a target), and the rest are negative examples. The positive and negative examples are used for calculating a loss function of the target detected by the current model. The loss function calculation is composed of a confidence loss, a target class loss and a localization loss. As the loss value is larger, a poorer detection capability of the model is reflected. As the loss value is smaller, the detection capability of the model is stronger. The target confidence loss is calculated using a binary cross entropy loss, and an expression of the loss calculation is as follows:

$$L_{conf}(o,c) = -\Sigma(o_i \ln(\hat{c}_i) + (1-o_i)\ln(1-\hat{c}_i))$$

$$\hat{c}_i = \text{sigmoid}(c_i)$$

where o represents a matching value between the default box and the real box: c represents a prediction probability of class p corresponding to the default box; $\hat{c}_i$ represents a prediction probability of class p corresponding to an $i^{th}$ default box: $L_{conf}(o,c)$ represents the confidence loss: sigmoid $(c_i)$ represents a nonlinear activation function class: $o_i \in \{1,0\}$, when the default box matches the real box, $o_i=1$, otherwise, $o_i=0$; $\hat{c}_i$ is the prediction probability of class p corresponding to the $i^{th}$ default box. Regardless of the matching between the positive example and the real box or the matching between the negative example and the background, the loss value is smaller as the prediction probability is higher.

The loss function is obtained by the weighted sum of confidence he loss, the localization loss and the target class loss, and an expression thereof is as follows:

$$L(O,o,C,c,l,g) = \lambda_1 L_{conf}(o,c) + \lambda_2 L_{cla}(O,C) + \lambda_3 L_{loc}(l,g)$$

where L (O,o, C,c,l, g) represents a total loss function: $L_{conf}(o,c)$ represents the confidence loss: $L_{cla}(O,C)$ represents the target class loss: $L_{loc}(l,g)$ represents the localization loss: $\lambda_1$, $\lambda_2$ and $\lambda_3$ are balance coefficients.

The training of the model is an iterative process that keeps the loss value smaller. In this process, each calculation of the loss value will be back-propagated to a model network to update and adjust various weight values in a hidden layer, thereby continuously improving the feature extraction capability of the network for a target in an image, so that the predicted box and the real box are more similar, and the model function capable of detecting a specific target is finally realized.

In step S3, the newly collected GPR profile images are intelligently identified by the target identification model YOLOV3 to realize the non-destructive detection of underground pipelines.

When the target identification model YOLOV3 training is completed, the model has the function of identifying the pipeline hyperbola in the GPR image. Therefore, when the newly collected GPR data image is processed by the target identification model YOLOV3, the pipeline hyperbola in the image will be automatically framed by a rectangle prediction box, and the confidence of the hyperbola will be displayed above the rectangle box. The application of the target identification model YOLOV3 to the intelligent identification of underground pipeline hyperbolas in the GPR image can help a detector to interpret the data and to timely feedback target information, thereby improving the detection efficiency, shortening the detection period, saving the time cost, and achieving significant economic and social values.

Figure 4:
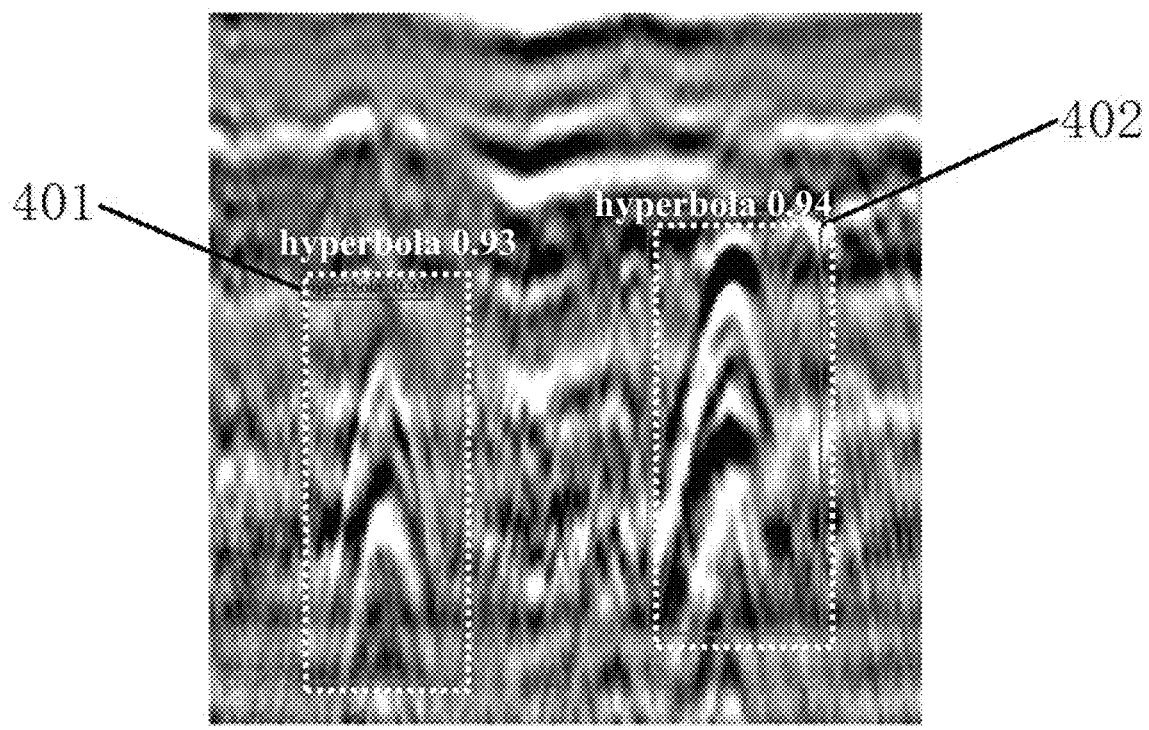
FIG. 4 is an effect diagram of identifying an underground pipeline target by a target identification model YOLOV3 according to an embodiment of the present disclosure.

FIG. 4 is an effect diagram of identifying an underground pipeline target by a target identification model YOLOV3. The hyperbola in the figure is the imaging of the underground pipeline in the GPR image. Blocks 401 and 402 in the figure are prediction blocks for target identification, hyperbola in the blocks means that the classification result is a hyperbolic feature, and the numbers on the blocks are detection identification accuracy (the identification accuracy of block 401 is 0.93, and the identification accuracy of box 402 is 0.94).

Corresponding to the method of FIG. 1, the present disclosure provides a GPR and deep learning-based underground pipeline detection system, including:

a dataset establishment module, configured to acquire sample data of known underground pipelines by means of a GPR, and establish an GPR B-scan data base according to the sample data:

FIG. 6 is schematic diagram of locating the pipelines. This figure describes an algorithm structure of the methods of migration, binarization and Apex localization. In this process the hyperbolic reflection signal of the underground pipeline is reconstructed by migration into a circular response. The specific steps of the localization algorithm are explained as follows:

Step 1: Hyperbola extraction. Through hyperbola recognition by the trained target identification model YOLOV3, the target region of interest is narrowed down. As a result, a target bounding box is obtained for the recognized underground pipeline.

Step 2: Diffraction stack migration. Migration is a common method in GPR data processing, and it collapses the detected hyperbolas into concentrated blobs at the hyperbolic apexes. A simple diffraction stacking algorithm is used for the migration-based image reconstruction. and an expression of the Diffraction stack migration is as follow:

$$E(x,z) = \sum_{i=1}^{m} S_i(t_i(x,z))$$

where E is the reconstructed GPR image, m is the number of traces in a GPR B-scan, Si is the amplitude of the i-th recorded GPR signal at the two way travel-time $t_i$, which is calculated from the relative coordinates of the which is calculated from the relative coordinates of the imaging point (x,z) and the antennas on the ground surface, as well as the velocity of the background medium.

Velocity is an essential parameter during the migration process. It should be consistent with the propagation velocity of EM waves in the background medium, so that the energy along the hyperbola can be focused at the underground pipeline position. To ensure that the migration results can reflect the target geometry and an expression of the auto-focusing indicator M is as follow:

$$M(k) = \frac{\sum_{i=1}^{m}\sum_{j=1}^{n}(|s_{ij}| - \hat{\mu})^k}{(mn-1)\hat{\sigma}^k}$$

where k value is greater than or equal to one, m and n are respectively the number of traces and the number of samples of the reconstructed image, û and ô are respectively the average value and variance of all pixel values in the reconstructed image. The medium velocity is determined according to the maximum value of M by testing different migration velocities.

Step 3: Binarization. Before binarization, Hilbert transformation is applied to every trace in the migrated GPR image, and an envelope image is obtained.

Step 4: Apex localization. After binarization, a Gaussian filter is applied to remove possible while spikes in the black background. An expression of the Gaussian filter is as follow:

$$h(x, y) = \frac{1}{2\pi\delta^2} e^{-\frac{x^2+y^2}{2\delta^2}}$$

where $\delta$ is a unit-less variable that controls the intensity of the Gaussian filter. Then, the hyperbolic shape in the GPR image becomes a smooth round-shape blob, The coordinates of all pixels of the white blob are utilized to calculate its centroid ($X_c$, $Y_c$). An expression of the centroid ($X_c$, $Y_c$) is as follow:

$$X_c = \frac{1}{m}\sum_{j=1}^{m} x_j \quad Y_c = \frac{1}{m}\sum_{j=1}^{m} y_j$$

where m is the total number of pixels in the white blob, and xj and yj are the abscissa and the ordinate of the j-th pixel, respectively.

The height H of the white blob is obtained by calculating the maximum $y_{max}$ and minimum $y_{min}$ ordinate of its pixels, an expression of the $y_{max}$ and $y_{min}$ is as follow:

$$H = y_{max} - y_{min}$$

Thus, the apex coordinates ($X_{apex}$, $Y_{apex}$) of the target color blob can be expressed follow:

$$X_{apex} = X_c$$

$$Y_{apex} = Y_c - \frac{H}{2}$$

The buried depth D of the underground pipeline is expressed by follow:

$$D = Y_{apex} \times v \times \Delta t$$

apex
where $\Delta t$ is the time interval between samples in the reconstructed GPR image, v is the velocity of EM waves propagating in the background medium in each detected hyperbola region, hence the velocity varies with the pipe location and depth.

an identification module, configured to perform training according to the GPR B-scan dataset to obtain a target identification model YOLOV3, the target identification model YOLOV3 being configured to identify hyperbolic data of the underground pipelines;

a detection module, configured to detect underground pipeline targets in a real radar image by means of the target identification model YOLOV3; and a localization module, configured to locate the position of the underground pipeline, the hyperbolic response of a pipeline is focused by migration, and transformed into a binary image by an iterative thresholding method. The apex of the hyperbola is employed to estimate both the horizontal position and the buried depth of the pipeline.

In summary, a GPR and target identification model YOLOV3-based intelligent underground pipeline detection method and system proposed by the embodiments of the present disclosure can precisely identify hyperbolic targets of pipelines in GPR images, locate the accurate position of the pipelines, and help, in practical applications, a detector to interpret the data and to timely feedback target information, thereby improving the detection efficiency, shortening the detection period, saving the time cost, and achieving significant economic and social values.

In addition, it should be noted that target identification model YOLOV3 has no precedent application in the field of intelligent GPR identification. The present disclosure can effectively combine a deep learning model and a GPR to realize automatic identification of underground pipelines, greatly improve the detection efficiency of detectors, and meet the requirements of engineering detection.

In the descriptions of this specification, references to descriptions of the terms "one embodiment", "some embodiments", "example", "specific example", or "some examples", etc. mean that a particular feature, structure, material, or characteristic described in connection with this embodiment or example is included in at least one embodiment or example of the present disclosure. In this specification, schematic representations of the above terms do not necessarily refer to the same embodiment or example. Moreover, the particular feature, structure, material, or characteristic described may be combined in any suitable manner in any one or more embodiments or examples.

While the embodiments of the present disclosure have been shown and described, it will be appreciated by those ordinarily skilled in the art that various changes, modifications, substitutions and variations may be made to these embodiments without departing from the principles and spirit of the present disclosure, and the scope of the present disclosure is defined by the claims and their equivalents.

The preferred embodiments of the present disclosure have been described above in detail. However, the present disclosure is not limited to the embodiments, and those skilled in the art can make various equivalent variations and substitutions without departing from the spirit of the present disclosure, which are included in the scope defined by the claims of this application.

The invention claimed is:

1. A ground penetrating radar (GPR) and deep learning-based underground pipeline detection method, comprising:
   acquiring sample data of known underground pipelines by means of a GPR, and establishing a GPR B-scan dataset according to the sample data;
   performing training according to the GPR B-scan dataset to obtain a target identification model You Only Look Once version 3 (YOLOV3)

identifying a hyperbola in a real GPR image of an underground pipeline target with the target identification model YOLOV3 to obtain a target bounding box for the underground pipeline target;

collapsing the hyperbola in the real GPR image into concentrated blobs at hyperbolic apexes by diffraction stack migration to obtain a reconstructed GPR image, and an expression of the diffraction stack migration is as follow:

$$E(x, z) = \sum_{i=1}^{m} S_i(t_i(x, z))$$

where E is the reconstructed GPR image, m is number of traces in a GPR B-scan, ta is a two way travel-time $t_i$, is amplitude of i-th recorded GPR signal at the two way travel-time to, which is calculated from relative coordinates of a imaging point (x,z) and antennas on a ground surface, as well as a velocity of a background medium;

applying a Hilbert transformation to each trace in the reconstructed GPR image to obtain an envelope image, and then binarising the image to distinguish target response from background;

applying a Gaussian filter to remove possible spikes in the background, thereby obtaining a round-shape blob that replaces the hyperbola in the real GPR image; and locating position of the underground pipeline target through an apex of the round-shape blob.

2. The GPR and deep learning-based underground pipeline detection method according to claim 1, wherein the acquiring sample data of known underground pipelines by means of thea GPR and establishing thea GPR B-scan dataset according to the sample data comprises:

acquiring scanning data of the known underground pipelines by means of the GPR;

converting the scanning data into grayscale GPR B-scan data;

filtering target GPR B-scan data from the grayscale GPR B-scan data, the target GPR B-scan data comprising a pipeline hyperbola;

performing data enhancement on the target GPR B-scan data;

cropping all images obtained after the data enhancement to obtain sample data; and constructing an GPR B-scan dataset according to the sample data.

3. The GPR and deep learning-based underground pipeline detection method according to claim 2, wherein the constructing thean GPR B-scan dataset according to the sample data comprises:

labeling a hyperbolic object in the sample data by means of a rectangular real box to obtain coordinate information of the rectangular real box;

dividing the sample data into a positive sample and a negative sample according to the coordinate information; and constructing an GPR B-scan dataset according to the positive sample and the negative sample.

4. The GPR and deep learning-based underground pipeline detection method according to claim 1, wherein a basic network of the target identification model YOLOV3 is a Darknet53 deep learning framework;

the Darknet53 deep learning framework is composed of 53 convolutional layers; and each of the convolutional layers comprises a batch normalization layer and a leaky rectified linear unit layer.

5. The GPR and deep learning-based underground pipeline detection method according to claim 4, wherein the batch normalization layer is configured to accelerate network training and network convergence; and the leaky rectified linear unit layer is configured to introduce a leaky value in a negative half interval of a rectified linear unit function, so that neuron is capable of continuing to learn after the rectified linear unit function enters a negative interval.

6. A ground penetrating radar (GPR) and deep learning-based underground pipeline detection system, comprising:

a dataset establishment module, configured to acquire sample data of known underground pipelines by means of a GPR, and establish a GPR B-scan dataset according to the sample data;

an identification module, configured to perform training according to the GPR B-scan dataset to obtain a target identification model You Only Look Once version 3 (YOLOV3);

a detection module, configured to identify a hyperbola in a real GPR image of an underground pipeline target with the target identification model YOLOV3 to obtain a target bounding box for the underground pipeline target; and a localization module, configured to:

collapse the hyperbola in the real GPR image into concentrated blobs at hyperbolic apexes by diffraction stack migration to obtain a reconstructed GPR image, and an expression of the diffraction stack migration is as follow:

$$E(x, z) = \sum_{i=1}^{m} S_i(t_i(x, z))$$

where E is the reconstructed GPR image, m is number of traces in a GPR B-scan, $t_i$ is a two way travel-time, Si is amplitude of i-th recorded GPR signal at the two way travel-time $t_i$, which is calculated from relative coordinates of a imaging point (x,z) and antennas on a ground surface, as well as a velocity of a background medium;

apply a Hilbert transformation to each trace in the reconstructed GPR image to obtain an envelope image, and then binarising the image to distinguish target response from background;

apply a Gaussian filter to remove possible spikes in the background, thereby obtaining a round-shape blob that replaces the hyperbola in the real GPR image; and locate position of the underground pipeline target through an apex of the round-shape blob.

* * * * *